US012570268B2

(12) United States Patent
Terada et al.

(10) Patent No.:    US 12,570,268 B2
(45) Date of Patent:        Mar. 10, 2026

(54) CONTROL DEVICE

(71) Applicant: AISIN CORPORATION, Aichi (JP)

(72) Inventors: Yosuke Terada, Kariya (JP); Hirotaka Mizuguchi, Kariya (JP)

(73) Assignee: AISIN CORPORATION, Aichi (JP)

( * ) Notice: Subject to any disclaimer, the term of this patent is extended or adjusted under 35 U.S.C. 154(b) by 154 days.

(21) Appl. No.:    18/700,299

(22) PCT Filed:    Nov. 21, 2022

(86) PCT No.:    PCT/JP2022/042972
§ 371 (c)(1),
(2) Date:    Apr. 11, 2024

(87) PCT Pub. No.: WO2023/095738
PCT Pub. Date: Jun. 1, 2023

(65)    Prior Publication Data
US 2024/0425035 A1    Dec. 26, 2024

(30)    Foreign Application Priority Data
Nov. 26, 2021    (JP) ................................. 2021-192379

(51) Int. Cl.
    *B60W 20/15*    (2016.01)
    *F16F 15/00*    (2006.01)
    *F16F 15/10*    (2006.01)
(52) U.S. Cl.
    CPC ........... *B60W 20/15* (2016.01); *F16F 15/002* (2013.01); *F16F 15/10* (2013.01); *B60W 2510/0657* (2013.01); *B60W 2510/1025* (2013.01)
(58) Field of Classification Search
    CPC ......... B60W 20/15; B60W 2510/0657; B60W 2510/1025; B60W 30/20; F16F 15/002; F16F 15/10; B60L 3/10
    See application file for complete search history.

(56)    References Cited

U.S. PATENT DOCUMENTS

2003/0176991 A1*    9/2003    Abe ...................... B60W 40/00
                                                                    701/68
2012/0078456 A1*    3/2012    Hakumura ........... B60W 10/115
                                                                    180/65.265
                        (Continued)

FOREIGN PATENT DOCUMENTS

CN        108136933 A    *    6/2018    ............ B60W 10/08
DE    112011102171 T5    4/2013
                        (Continued)

OTHER PUBLICATIONS

The extended European search report issued on Mar. 11, 2025, by the European Patent Office in corresponding European Patent Application No. 22898521.4. (9 pages).
                        (Continued)

*Primary Examiner* — Syed O Hasan
(74) *Attorney, Agent, or Firm* — BUCHANAN INGERSOLL & ROONEY PC

(57)        ABSTRACT

There are provided: an input torque detection part configured to detect an input torque variation value; a first filter processing part configured to extract and obtain, from the input torque variation value, a post-first-filter variation value that varies with a specific variation period; a vibration reduction control part configured to calculate an opposite-phase torque variation value whose phase is opposite to a phase of the post-first-filter variation value, and execute vibration reduction processing; and a second filter processing part configured to extract and obtain, from the post-first-filter variation value, a post-second-filter variation value that varies with a period longer than the specific variation period. The vibration reduction control part is configured to cause the vibration reduction processing to be brought into a non-execution state based on the post-second-filter variation value.

20 Claims, 4 Drawing Sheets

(56)                 References Cited

U.S. PATENT DOCUMENTS

2013/0024057 A1*   1/2013   Jung ..................... B60W 10/06
                                                    180/65.265
2021/0309206 A1   10/2021   Mizuguchi et al.
2022/0017061 A1    1/2022   Mizuguchi et al.

FOREIGN PATENT DOCUMENTS

DE        102016109973 A1 *  12/2016  ...... B60W 30/18127
JP           2020116978 A      8/2020

OTHER PUBLICATIONS

International Search Report (PCT/ISA/210) with translation and Written Opinion (PCT/ISA/237) mailed on Feb. 14, 2023, by the Japanese Patent Office as the International Searching Authority for International Application No. PCT/JP2022/042972. (8 pages).

* cited by examiner

CONTROL DEVICE

TECHNICAL FIELD

The present invention relates to a control device whose control target is a vehicle drive device including an input member drivingly coupled to an internal combustion engine, an output member drivingly coupled to a wheel, and a rotary electric machine provided to transmit torque to a power transmission path connecting the input member and the output member.

BACKGROUND ART

JP 2020-116978 A discloses a control device that causes torque vibration transmitted to an input member drivingly coupled to a crankshaft of an internal combustion engine to be reduced by opposite-phase torque output from a rotary electric machine, in a vehicle drive device including the internal combustion engine and the rotary electric machine. This control device estimates torque (damper torque) generated in a damper drivingly coupled to the crankshaft of the internal combustion engine, on the basis of a crank angle of the crankshaft and a rotational position (electric angle) of a rotor of the rotary electric machine, and causes the rotary electric machine to output vibration reduction torque (motor torque) that has been subjected to correction processing so as to have a phase opposite to that of the damper torque after filter processing. As a result, among the types of damper torque, torque variation that causes booming noise in the vehicle is reduced.

CITATION LIST

Patent Literature

Patent Literature 1: JP 2020-116978 A

SUMMARY OF INVENTION

Technical Problems

In the control device described above, a vibration component other than a vibration component having an explosion primary period in a combustion stroke of the internal combustion engine is attenuated in the filter processing for the estimated damper torque. However, the vibration component other than the vibration component having the explosion primary period may remain depending on the characteristics of the filter. In addition, as described above, the vibration reduction torque is torque having a phase opposite to that of the damper torque after the filter processing, and thus the vibration component having the explosion primary period is reduced with the vibration reduction torque, but the vibration component other than the vibration component having the explosion primary period may be amplified with the vibration reduction torque. For example, in a relatively rapid step response-like change in an accelerator opening degree, a slip of a wheel, traveling on a wavy road, or the like, the vibration component other than the vibration component having the explosion primary period may not be sufficiently reduced, and the vibration of the vehicle may increase.

In view of the above, it is desirable to provide a technique capable of reducing vibration of a vehicle occurring due to variation of torque transmitted from an internal combustion engine, and avoiding aggravation, of the vibration of the vehicle, caused due to vibration reduction torque that is output from a rotary electric machine and that is output for reducing the vibration.

Solution to Problems

A control device provided in view of the above problems is a control device whose control target is a vehicle drive device including an input member drivingly coupled to an internal combustion engine, an output member drivingly coupled to a wheel, and a rotary electric machine provided to transmit torque to a power transmission path connecting the input member and the output member.

The control device includes:

an input torque detection part configured to detect an input torque variation value that is a time-varying value of torque transmitted from the internal combustion engine side to the input member;

a first filter processing part configured to:

execute first filter processing of extracting, from the input torque variation value, a torque component that varies with a specific variation period in accordance with a rotation speed of the internal combustion engine; and obtain a post-first-filter variation value;

a vibration reduction control part configured to execute vibration reduction processing of calculating an opposite-phase torque variation value that is a torque variation value whose phase is opposite to a phase of the post-first-filter variation value and causing torque corresponding to the opposite-phase torque variation value to be superimposed on output torque of the rotary electric machine; and a second filter processing part configured to:

execute second filter processing of extracting, from the post-first-filter variation value, a torque component that varies with a period longer than the specific variation period; and obtain a post-second-filter variation value, in which the vibration reduction control part is configured to cause the vibration reduction processing to be brought into a non-execution state based on the post-second-filter variation value.

By executing the vibration reduction processing, it is possible to reduce the torque component that varies with the specific variation period in accordance with the rotation speed of the internal combustion engine. However, depending on the filter characteristics in the first filter processing, there are possibilities that a torque component having a period different from the specific variation period, in particular, a period longer than the specific variation period cannot be appropriately removed, and that the longer-period torque variation may be amplified through the vibration reduction processing. According to the configuration, the vibration reduction processing is caused to be brought into the non-execution state based on the post-second-filter variation value. Thus, it is possible to cause the vibration reduction processing not to be executed, in a case where the longer-period torque variation is amplified through the vibration reduction processing. Therefore, it is possible to avoid amplifying the longer-period torque variation, thereby avoiding aggravating the vibration of the vehicle. That is, according to the configuration, it is possible to reduce the vibration of the vehicle occurring due to the variation of the torque transmitted from the internal combustion engine, and it is possible to avoid the aggravation, of the vibration of the vehicle, caused due to the vibration reduction torque that is output from the rotary electric machine and that is output for reducing the vibration.

Further features and advantages of a control device whose control target is a vehicle drive device will become apparent from the description of exemplary and non-limiting embodiments given below with reference to the drawings.

DESCRIPTION OF EMBODIMENTS

Hereinafter, embodiments of a control device whose control target is a vehicle drive device will be described with reference to the drawings. Note that, as used herein, the expression "drivingly coupled" refers to a state in which two rotary elements are coupled to be able to transmit drive power, and includes a state in which the two rotary elements are coupled to rotate together or a state in which the two rotary elements are coupled to be able to transmit drive power via one, or two or more transmission members. Examples of such a transmission member include various members that transmit rotation at the same speed or at a changed speed, such as a shaft, a gear mechanism, a belt, and a chain. Note that the transmission member may include an engagement device that selectively transmits rotation and drive power, such as a friction engagement device or a meshing-type engagement device.

Figure 1:
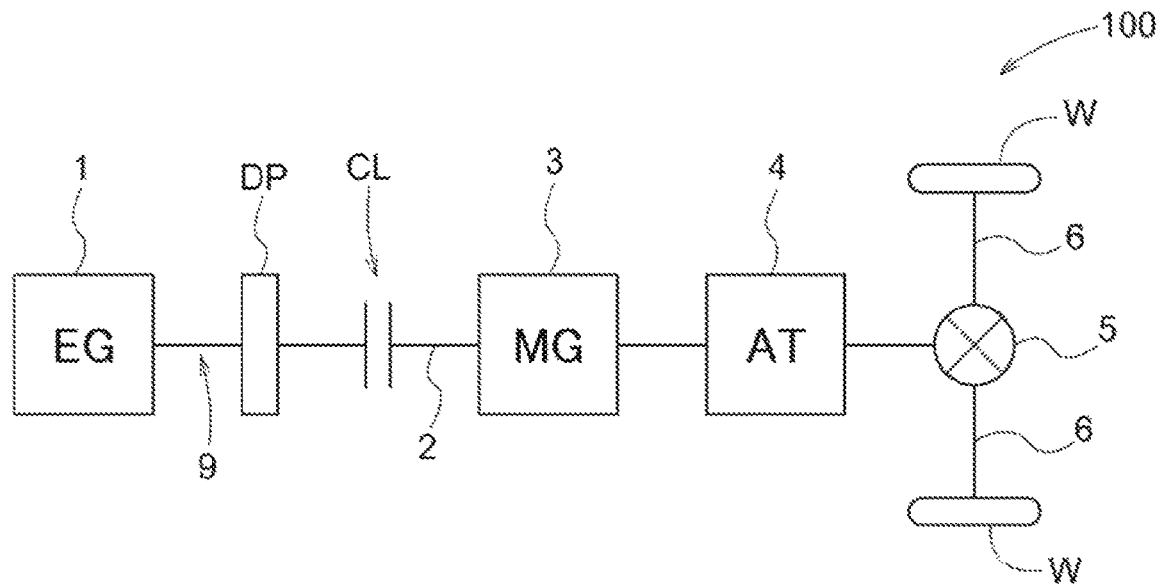
FIG. 1 is a schematic configuration diagram of a vehicle drive device.

FIG. 1 shows an example of a vehicle drive device 100. As shown in FIG. 1, the vehicle drive device 100 according to the present embodiment includes an internal combustion engine 1, a damper DP, a clutch CL, a rotary electric machine 3, an automatic transmission 4, and a differential gear device 5. As shown in FIG. 1, the internal combustion engine 1 and the rotary electric machine 3 are drivingly coupled via the damper DP and the clutch CL. The rotary electric machine 3 functions as an electric motor (that is, performs power running), and also functions as a generator (that is, performs regeneration). Here, a member that inputs power to the rotary electric machine 3 will be described as an input member 2 in the vehicle drive device 100. In the present embodiment, an output shaft 9 of the internal combustion engine 1 and the input member 2 coupled to a rotor shaft (not shown) of the rotary electric machine 3 are drivingly coupled via the damper DP and the clutch CL.

The clutch CL is an engagement device that can connect and disconnect power transmission between the internal combustion engine 1 and the rotary electric machine 3. In a state where the clutch CL is engaged, power is transmitted between the internal combustion engine 1 and the rotary electric machine 3, and in a state where the clutch CL is disengaged, power is not transmitted between the internal combustion engine 1 and the rotary electric machine 3. For example, in the state where the clutch CL is disengaged, the rotary electric machine 3 can function as an electric motor to drive wheels W by using electric power from a not-shown electric storage device (a secondary battery, a capacitor, or the like) (electric vehicle mode (EV mode)).

In the state where the clutch CL is engaged, a hybrid mode (HV mode) or a charge mode can be mainly performed. In the hybrid mode, the rotary electric machine 3 functions as an electric motor. The vehicle drive device 100 can drive the wheels W by using torque of the internal combustion engine 1 and torque of the rotary electric machine 3. In the charge mode, the rotary electric machine 3 functions as a generator. While the vehicle drive device 100 can drive the wheels W by using the torque of the internal combustion engine 1, the vehicle drive device 100 can cause the rotary electric machine 3 to generate electric power by using the torque of the internal combustion engine 1, thereby charging the not-shown electric storage device.

Note that, in a case where the clutch CL is in the state of being engaged, it is possible to cause the rotary electric machine 3 to output vibration reduction torque through vibration reduction processing to be described later in both the hybrid mode and the charge mode. In the hybrid mode, the vibration reduction torque is superimposed on so-called power-running torque, and in the charge mode, the vibration reduction torque is superimposed on so-called regeneration torque.

As shown in FIG. 1, in the present embodiment, a mode is exemplified in which the output shaft 9 of the internal combustion engine 1 and the input member 2 coupled to the rotor shaft of the rotary electric machine 3 are drivingly coupled via the damper DP and the clutch CL. However, the vehicle drive device 100 that is a control target of the control device 10 simply needs to include at least the input member 2 drivingly coupled to the internal combustion engine 1, an output member 6 drivingly coupled to the wheel W, and the rotary electric machine 3 provided to transmit torque to a power transmission path connecting the input member 2 and the output member 6. That is, the vehicle drive device 100 need not include at least one of the damper DP or the clutch CL. In a case where the clutch CL is not included, the electric vehicle mode (specifically, an electric vehicle mode in which rotation together with the internal combustion engine 1 is not performed) cannot be performed, and the hybrid mode and the charge mode can be executed.

In addition, in the present embodiment, as shown in FIG. 1, torque from the internal combustion engine 1 and the rotary electric machine 3 is distributed to a pair of output members 6 through the differential gear device 5, and each of the pair of output members 6 is drivingly coupled to a corresponding one of the pair of wheels W. Thus, it can be considered that the differential gear device 5 also corresponds to the output member 6. In addition, the mode shown in FIG. 1 exemplifies a mode in which the automatic transmission 4 is provided between the rotary electric machine 3 and the output member 6. However, the vehicle drive device 100 may be configured while the vehicle drive device 100 does not include the automatic transmission 4.

Figure 2:
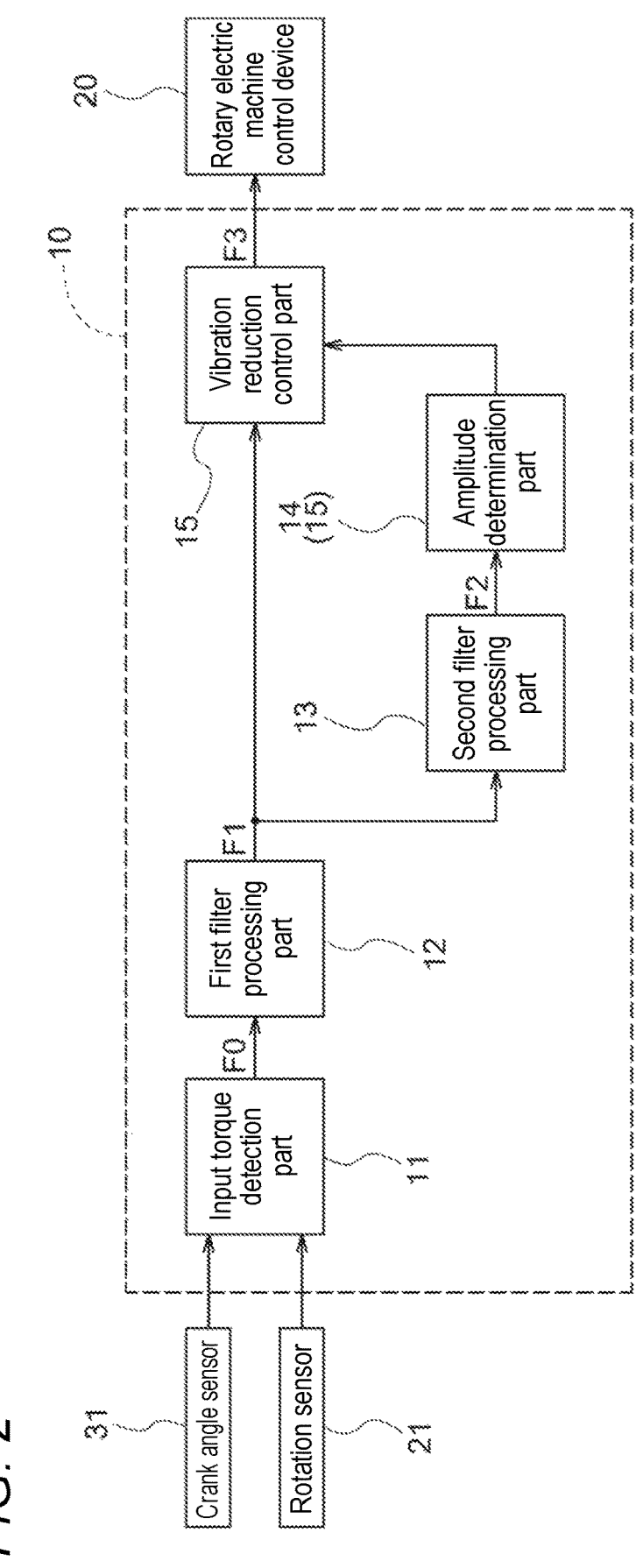
FIG. 2 is a schematic block diagram of a control device.

Incidentally, as is well known, in a typical four-stroke internal combustion engine, a vibration component having a so-called explosion primary period is generated in a combustion stroke, and is superimposed on output torque from the internal combustion engine 1. This vibration component having the explosion primary period also causes booming noise in the vehicle, and thus it is desirable to reduce the vibration component. Therefore, as shown in FIG. 2, the control device 10 of the present embodiment includes an input torque detection part 11, a first filter processing part 12, and a vibration reduction control part 15.

The input torque detection part 11 detects an input torque variation value F0 that is a time-varying value of torque transmitted from the internal combustion engine 1 side to the input member 2. For example, in a case where the damper DP is provided between the internal combustion engine 1 and the input member 2 as in the present embodiment, the rotation of the output shaft 9 of the internal combustion engine 1 and the rotation of the input member 2 are different from each other. The input torque detection part 11 can calculate a variation value of torque transmitted from the damper DP to the input member 2 in accordance with torque variation of the internal combustion engine 1, on the basis of an internal combustion engine output angle that is a rotation angle of the output shaft 9 of the internal combustion engine 1 and an input member angle that is a rotation angle of the input member 2 (specifically, on the basis of a difference between these two angles), and can detect the calculation result as the input torque variation value F0. That is, even in a case where the damper DP is provided between the internal combustion engine 1 and the input member 2, the control device 10 can appropriately detect the input torque variation value F0, and can execute the vibration reduction processing through the vibration reduction control part 15.

The internal combustion engine output angle is detected by, for example, a crank angle sensor 31 that detects a crank angle of the internal combustion engine 1. In addition, the input member angle is detected by, for example, a rotation sensor 21 such as a resolver that detects rotation of the rotor of the rotary electric machine 3 (a rotation speed, and a position of the rotor (corresponding to a magnetic pole position in the case of using a permanent-magnet-type rotary electric machine)). As described above, the rotor shaft of the rotary electric machine 3 is coupled to the input member 2. Moreover, the rotary electric machine 3 is controlled by a rotary electric machine control device 20 on the basis of the detection result from the rotation sensor 21 such as a resolver. Thus, the rotation sensor 21 can detect the input member angle. In this manner, the input torque detection part 11 can detect the input torque variation value F0 on the basis of the detection results from the rotation sensor 21 and the crank angle sensor 31. Of course, a sensor that detects the rotation angle of the input member 2 may be separately provided, and the input member angle may be detected by this sensor.

Note that, in a case where the damper DP is not provided, the output shaft 9 of the internal combustion engine 1 and the input member 2 are directly drivingly coupled (this includes a case in which the output shaft 9 and the input member 2 are drivingly coupled via the clutch CL). In this case, the input torque variation value F0 may be estimated from a difference (angle difference) between the detection results from the crank angle sensor 31 and the rotation sensor 21 and a rigidity value of members from the internal combustion engine 1 to the rotary electric machine 3 (for example, by multiplication of both, or the like).

The first filter processing part 12 executes first filter processing of extracting, from the input torque variation value F0, a torque component that varies with a specific variation period in accordance with the rotation speed of the internal combustion engine 1, and obtains a post-first-filter variation value F1. Here, the specific variation period is the explosion primary period in the combustion stroke described above. In addition, the first filter processing part 12 includes, for example, a low-pass filter that allows a torque component having a period equal to or longer than the specific variation period to pass (allows a torque component having a frequency equal to or lower than a specific variation frequency corresponding to the specific variation period to pass), or a band-pass filter that allows a torque component having a period in the vicinity of (about 0.8 times to 1.2 times as long as) the specific variation period to pass (allows a torque component having a frequency corresponding to the period in the vicinity to pass).

The vibration reduction control part 15 executes the vibration reduction processing of calculating an opposite-phase torque variation value F3 that is a torque variation value whose phase is opposite to that of the post-first-filter variation value F1 and causing torque corresponding to the opposite-phase torque variation value F3 to be superimposed on the output torque of the rotary electric machine 3. The rotary electric machine control device 20 executes drive control of the rotary electric machine 3 on the basis of a torque command (required torque) provided from a vehicle control device (not shown). The vibration reduction control part 15 calculates the opposite-phase torque variation value F3 serving as the vibration reduction torque superimposed on the torque command, and provides the opposite-phase torque variation value F3 to the rotary electric machine control device 20. The rotary electric machine control device 20 superimposes the opposite-phase torque variation value F3 serving as the vibration reduction torque on the torque command to execute drive control of the rotary electric machine 3.

As described above, the control device 10 extracts, as the post-first-filter variation value F1, the torque component that is included in the input torque variation value F0 and that varies with the specific variation period corresponding to the explosion primary period. Then, the control device 10 reduces the post-first-filter variation value F1 by causing the rotary electric machine 3 to output the torque of the opposite-phase torque variation value F3 whose phase is opposite to that of the extracted post-first-filter variation value F1. That is, the control device 10 reduces the vibration having the explosion primary period. However, the filter provided in the first filter processing part 12 has a certain width within which the frequency is allowed to pass, and thus the post-first-filter variation value F1 may include a torque component having a period other than the vibration having the explosion primary period. Therefore, depending on the characteristics of the filter, a vibration component other than the vibration component having the explosion primary period may remain in the post-first-filter variation value F1. In particular, in a case where the filter is configured as a low-pass filter, a torque component having a period longer than the explosion primary period may remain in the post-first-filter variation value F1. In addition, in a case where even the filter is configured as a band-pass filter but the amplitude of the torque component having a period longer than the explosion primary period is large, this torque component may not be sufficiently attenuated through the filter, and may remain in the post-first-filter variation value F1.

For this reason, even when the vibration component having the explosion primary period is reduced with the opposite-phase torque variation value F3, the vibration component other than the vibration component having the explosion primary period may not be reduced, or may be rather amplified with the vibration reduction torque. For example, a vibration component different from the vibration component having the explosion primary period may be generated through a relatively rapid step response-like change in an accelerator opening degree, a slip of the wheel W (including a case in which wheelspin continues), a wheel grip of the wheel W after a slip, traveling on a wavy road, or the like. In such a case, the vibration component of the torque may not be sufficiently reduced with the opposite-phase torque variation value F3, and furthermore, the vibration of the vehicle may increase.

Therefore, the control device 10 of the present embodiment further includes a second filter processing part 13 that executes second filter processing of extracting, from the post-first-filter variation value F1, a torque component that varies with a period longer than the specific variation period, and that obtains a post-second-filter variation value F2. The period longer than the specific variation period is, for example, a period that is twice, preferably three times or more as long as the specific variation period. The second filter processing part 13 includes, for example, a low-pass filter that allows a torque component having a period that is 2 times to 3 times or more as long as the specific variation period to pass (allows a torque component having a frequency equal to or lower than a frequency corresponding to the period that is 2 times to 3 times or more as long as the specific variation period to pass), or a band-pass filter that allows a torque component having a period in the vicinity of (about 0.8 times to 1.2 times as long as) the period that is 2 times to 3 times or more as long as the specific variation period to pass (allows a torque component having a frequency corresponding to the period in the vicinity to pass).

As described above, the situation of the vehicle in which the torque component that is difficult to remove through the first filter processing appears is assumable to some extent. For example, the second filter processing part 13 is preferably configured to extract a torque component that varies with a period of torque variation generated in the power transmission path due to at least one of a stepwise change in an accelerator opening degree of the vehicle or a state transition between a slipping state and a gripping state of the wheel W. In a situation where the torque component that is difficult to remove through the first filter processing is appropriately extracted, and in a situation where it is preferable not to execute the vibration reduction processing (in a situation where the vibration reduction processing needs to be in a non-execution state), it is possible to appropriately cause the vibration reduction processing not to be executed.

Of course, it does not preclude setting of the characteristics of the second filter processing part 13 through simulation, experiment, or the like without assuming a specific situation of the vehicle.

Then, in a case where the amplitude of the post-second-filter variation value F2 is equal to or greater than a defined determination threshold value, the vibration reduction control part 15 causes the vibration reduction processing described above to be brought into the non-execution state, and does not execute the vibration reduction processing. That is, the vibration reduction control part 15 does not provide the opposite-phase torque variation value F3 to the rotary electric machine control device 20, and the rotary electric machine control device 20 executes drive control of the rotary electric machine 3 without superimposing the torque (vibration reduction torque) based on the opposite-phase torque variation value F3 on the torque command. Note that, as shown in FIG. 1, in the present embodiment, a configuration is exemplified that includes an amplitude determination part 14 that determines whether or not the amplitude of the post-second-filter variation value F2 is equal to or greater than the defined determination threshold value. The amplitude determination part 14 is also included in the vibration reduction control part 15.

The determination threshold value described above is set to, for example, a value that is 5 times or more, for example, about 5 to 10 times as great as the torque amplitude of the explosion primary period of the internal combustion engine 1. In this case, when the amplitude of the post-second-filter variation value F2 is five times or more as great as the torque amplitude of the explosion primary period, the vibration reduction processing is not executed, and thus the vibration of the vehicle is not aggravated. In addition, when the amplitude of the post-second-filter variation value F2 is less than five times, the torque vibration having the explosion primary period is reduced through the vibration reduction processing. Therefore, it is possible to reduce the vibration of the vehicle occurring due to the variation of the torque transmitted from the internal combustion engine 1, and it is possible to appropriately avoid the aggravation, of the vibration of the vehicle, caused due to the vibration reduction torque that is output from the rotary electric machine 3 and that is output for reducing the vibration.

Note that the determination threshold value may be defined on the basis of an absolute value of torque (for example, 15 to 25 [Nm] or more, or the like) based on an experiment or a simulation, instead of using the ratio with respect to the torque amplitude of the explosion primary period, described above.

As described above, in the control device 10 of the present embodiment, the vibration reduction processing is not executed in a case where the torque component having the period longer than the specific variation period is large. Thus, it is possible to avoid amplifying this longer-period torque variation, thereby avoiding aggravating the vibration of the vehicle.

Figure 3:
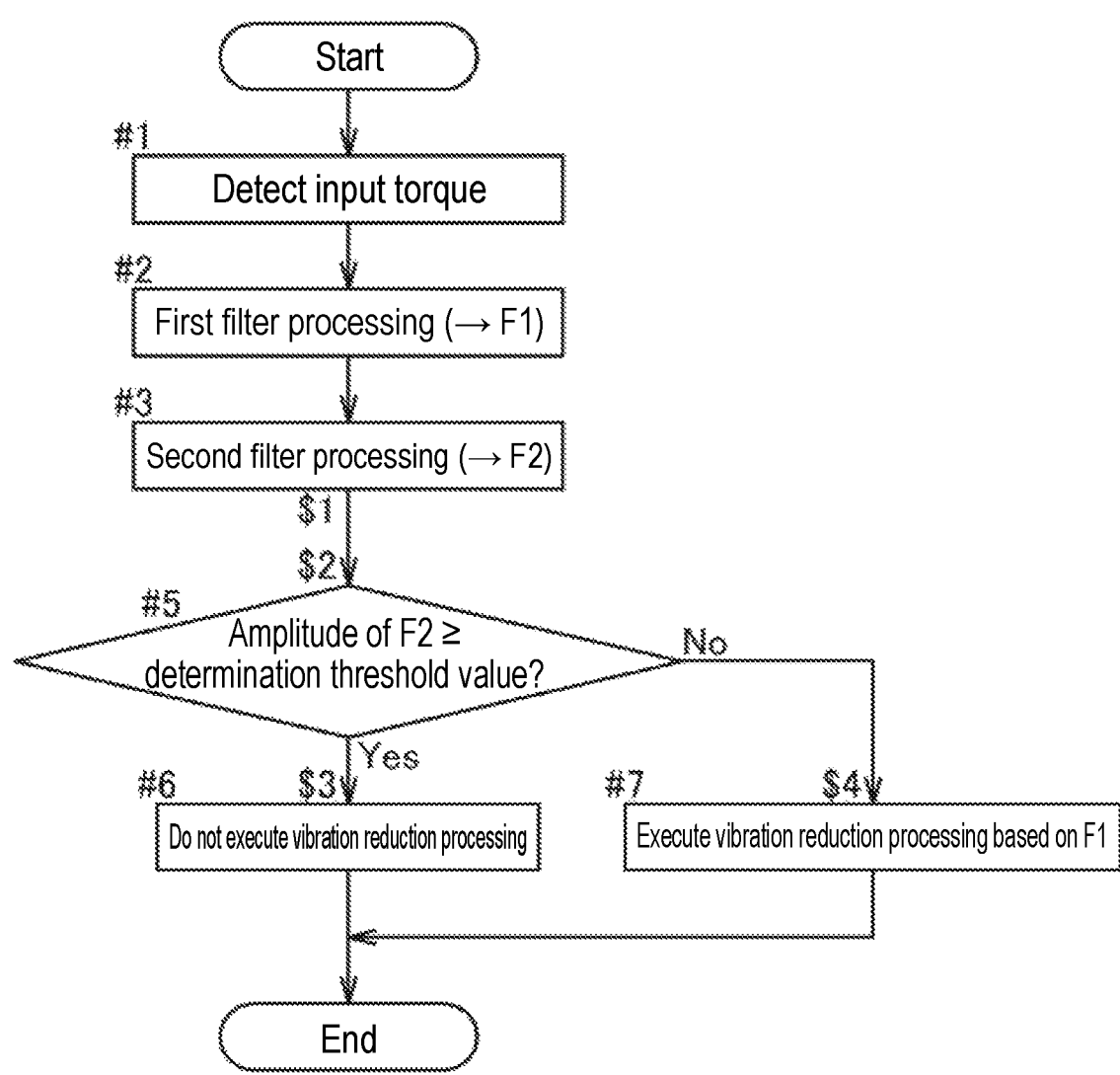
FIG. 3 is a flowchart showing an example of control by the control device.

The flowchart of FIG. 3 shows an example of a control procedure executed by the control device 10, including a case in which the vibration reduction processing is not executed as described above (a case of non-execution of the vibration reduction processing/a case of a stop of the vibration reduction processing). The control device 10 includes, for example, a microcomputer as a core member, and the control device 10 is implemented in cooperation between such hardware and software such as a program.

First, the control device 10 executes, through the input torque detection part 11, input torque detection processing of detecting the input torque variation value F0, which is the time-varying value of the torque transmitted from the internal combustion engine 1 side to the input member 2 (#1). Next, the control device 10 executes, through the first filter processing part 12, the first filter processing (#2) of extracting, from the input torque variation value F0, the torque component that varies with the specific variation period in accordance with the rotation speed of the internal combustion engine 1. As a result of the first filter processing (#2), the post-first-filter variation value F1 is obtained. Next, the control device 10 executes, through the second filter processing part 13, the second filter processing (#3) of extracting, from the post-first-filter variation value F1, the torque component that varies with a period longer than the specific variation period. As a result of the second filter processing (#3), the post-second-filter variation value F2 is obtained.

Next, the control device 10 determines, through the amplitude determination part 14 (vibration reduction control part 15), whether or not the amplitude of the post-second-filter variation value F2 is equal to or greater than the defined determination threshold value (#5). In a case where the amplitude of the post-second-filter variation value F2 is equal to or greater than the determination threshold value, the vibration reduction control part 15 of the control device 10 does not execute the vibration reduction processing (#6). That is, the vibration reduction control by the vibration reduction control part 15 is caused to be brought into the non-execution state. Note that the expression "causing the vibration reduction processing to be brought into the non-execution state" includes both of shifting from an execution state in which the vibration reduction processing is already executed to the non-execution state, that is, stopping the vibration reduction processing, and not executing the vibration reduction processing in a situation where the vibration reduction processing is not yet executed because of circumstances immediately after the start of traveling of the vehicle or the like.

On the other hand, in a case where the amplitude of the post-second-filter variation value F2 is smaller than the determination threshold value, the vibration reduction control part 15 of the control device 10 executes the vibration reduction processing (#7). In other words, the vibration reduction control by the vibration reduction control part 15 is caused to be brought into the execution state. That is, the control device 10 executes, through the vibration reduction control part 15, the vibration reduction processing of calculating the opposite-phase torque variation value F3, which is the torque variation value whose phase is opposite to that of the post-first-filter variation value F1, and causing the torque corresponding to the opposite-phase torque variation value F3 to be superimposed on the output torque of the rotary electric machine 3.

As described above, on the basis of the post-second-filter variation value F2, specifically, in a case where the amplitude of the post-second-filter variation value F2 is equal to or greater than the determination threshold value, the non-execution state, in which the vibration reduction processing is not immediately executed, is obtained. Thus, aggravation of the vibration of the vehicle is promptly reduced.

Incidentally, the torque component having a period longer than the specific variation period becomes large, in a case where a relatively rapid step response-like change occurs in an accelerator opening degree, in a case where a slip of the wheel W occurs, in a case where a wheel grip of the wheel W occurs after a slip, in a case where traveling is performed on a wavy road, or the like, as described above. Thus, for example, it is also possible to cause the vibration reduction processing not to be executed, after determination is made whether or not to execute the vibration reduction processing, executed through the vibration reduction control part 15, on the basis of a rapid change in an accelerator opening degree detected by an accelerator sensor or the like, a rapid change in a detection result from a rotation sensor for the wheel W, a detection result from a vibration sensor of the vehicle at the time of traveling on a wavy road, or the like. However, there are various time lags until such a change in behavior in the vehicle affects the vibration of the vehicle, and thus there is a case in which it is not possible to uniformly define whether the vibration reduction processing for the vibration caused due to the explosion primary period of the internal combustion engine 1 does not need to be executed (whether the vibration reduction processing may be stopped). In the present embodiment, the determination as to whether or not to execute the vibration reduction processing is made on the basis of the vibration component of the torque actually transmitted to the vehicle drive device 100. That is, the determination as to whether or not to execute the vibration reduction processing is made on the basis of vibration detected when the vibration is transmitted to the vehicle drive device 100. Thus, it is possible to allow more appropriate vibration reduction control.

The processing shown in the flowchart of FIG. 3 is executed periodically. That is, step #6 (or step #7) is repeatedly executed. In accordance with the flowchart of FIG. 3, as described above, in a case where the amplitude of the post-second-filter variation value F2 is determined to be equal to or greater than the determination threshold value in step #5, the vibration reduction processing is immediately caused to be brought into the non-execution state (#6). In addition, in a case where, while the non-execution state, in which the vibration reduction processing is not executed, is maintained, the amplitude of the post-second-filter variation value F2 is determined to be smaller than the determination threshold value in step #5, the vibration reduction processing is immediately executed (#7). As described above, by allowing promptly switching as to whether or not to execute the vibration reduction processing, the control device 10 can appropriately execute the vibration reduction control in accordance with a situation. However, in a case where the amplitude of the post-second-filter variation value F2 is near the determination threshold value, the execution (#7) and the non-execution (#6) of the vibration reduction processing are frequently repeated, and the stability of the control may be lost.

Therefore, in a case where, while the non-execution state, in which the vibration reduction processing is not executed, is maintained, the amplitude of the post-second-filter variation value F2 is determined to be smaller than the determination threshold value, the vibration reduction control part 15 preferably starts (resumes) the execution of the vibration reduction processing after a defined time Tref defined in advance has elapsed, instead of immediately starting the execution of the vibration reduction processing (instead of immediately resuming the execution of the vibration reduction processing, in a case where the state has been switched from the execution state to the non-execution state). That is, as will be described below with reference to the flowchart of FIG. 4, the vibration reduction control part 15 preferably starts the vibration reduction processing, in a case where the vibration reduction processing is in the non-execution state and a time period T during which the amplitude of the post-second-filter variation value F2 is smaller than the determination threshold value has lasted for the defined time Tref or longer. For example, in a case where the time period T, during which the amplitude of the post-second-filter variation value F2 is smaller than the determination threshold value, has lasted for the defined time Tref or longer after the vibration reduction processing has been in the non-execution state, the vibration reduction processing can be started again. Note that the defined time Tref can be, for example, about 500 times (about 250 times to 1000 times) as long as the execution period (control period) described above (the defined time Tref can be set to about 0.5 to 2 seconds in a case where the execution period is 2 [ms]).

As described with reference to FIG. 3, after the torque component having the period longer than the specific variation period becomes small, the vibration reduction processing is resumed. That is, in a case where there is no possibility that the longer-period torque variation is amplified through the vibration reduction processing, it is possible to appropriately reduce the torque component that varies with the specific variation period in accordance with the rotation speed of the internal combustion engine 1. Thus, it is possible to reduce an influence of the torque transmitted from the internal combustion engine 1 on the vibration of the vehicle. In addition, the vibration reduction control part 15 causes the vibration reduction processing to be brought into the execution state, in a case where the vibration reduction processing is in the non-execution state and the time period T, during which the amplitude of the post-second-filter variation value F2 is smaller than the determination threshold value, has lasted for the defined time Tref or longer.

Thus, the execution state (#7) and the non-execution state (#6) of the vibration reduction processing are repeated for each control period (execution period), and a lack in the stability of the control is avoided.

Figure 4:
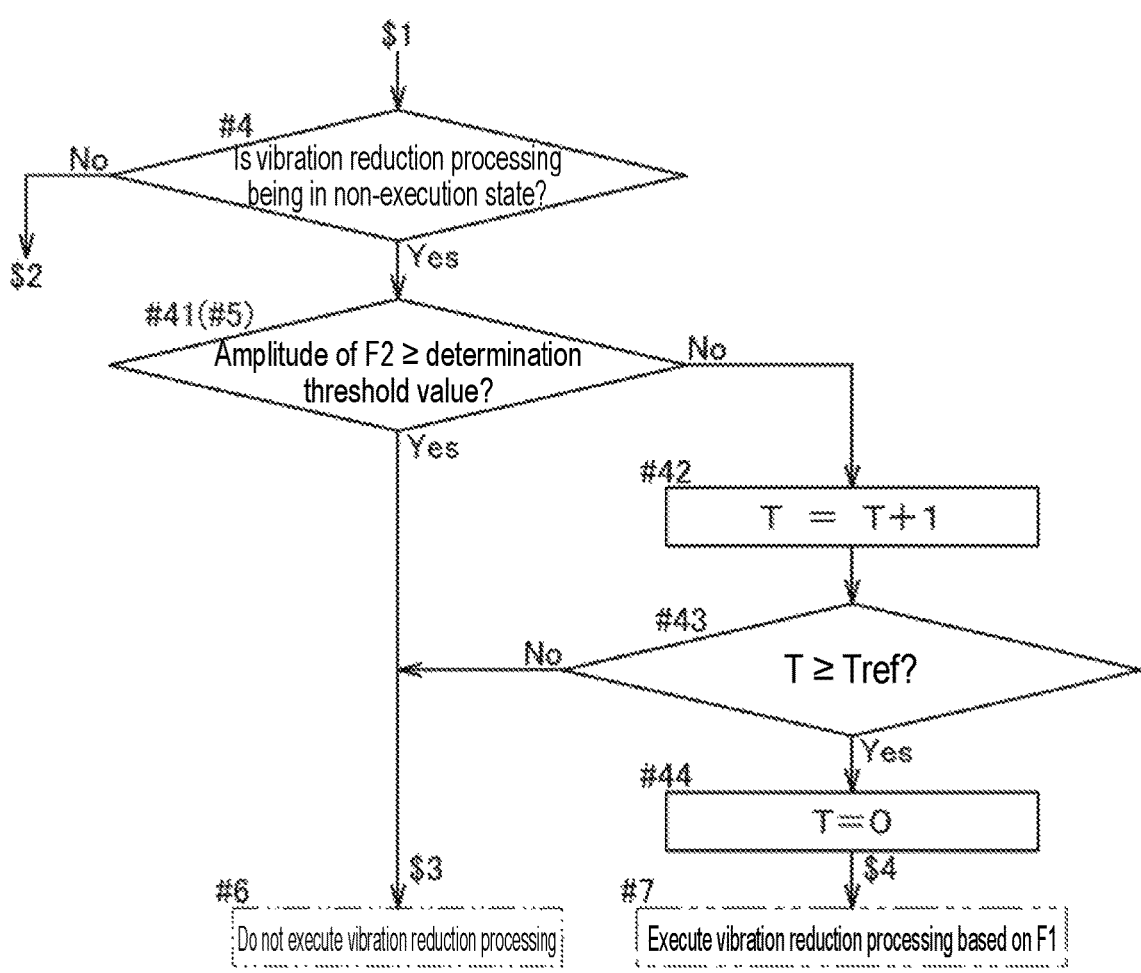
FIG. 4 is a flowchart showing another example of the control by the control device.

After the post-second-filter variation value F2 is obtained in step #3 of FIG. 3, the control device 10 determines, as shown in FIG. 4, whether or not the vibration reduction processing is in the non-execution state (#3→$1→#4). In a case where the vibration reduction processing is not in the non-execution state, that is, in a case where the vibration reduction processing is being executed (in a case where the vibration reduction processing is in the execution state), as described above with reference to FIG. 3, the control device 10 determines, through the amplitude determination part 14, whether or not the amplitude of the post-second-filter variation value F2 is equal to or greater than the determination threshold value (#4→$2→#5). The processing subsequent to step #5 is as described above with reference to FIG. 3.

Also in a case where the vibration reduction processing is determined to be in the non-execution state in step #4, the control device 10 determines, through the amplitude determination part 14, whether or not the amplitude of the post-second-filter variation value F2 is equal to or greater than the determination threshold value as in step #5 (#4→#41). Step #5 and step #41 are the same in the processing contents (determination criteria), but are different from each other in the processing after the determination.

In step #41, in a case where the amplitude of the post-second-filter variation value F2 is equal to or greater than the determination threshold value, the non-execution state of the vibration reduction processing is continued. That is, as described with reference to FIG. 3, the vibration reduction control part 15 of the control device 10 causes the vibration reduction processing to be brought into the non-execution state (#41→$3→#6). On the other hand, in a case where the amplitude of the post-second-filter variation value F2 is smaller than the defined determination threshold value, as will be described later with reference to FIG. 4, the vibration reduction control part 15 causes the vibration reduction processing to be brought into the execution state, in a case where the time period T, during which the amplitude of the post-second-filter variation value F2 is smaller than the determination threshold value, lasts for the defined time Tref or longer (#41→ . . . →$4→#7).

Specifically, in a case where the amplitude of the post-second-filter variation value F2 is determined to be smaller than the determination threshold value in step #41, the vibration reduction control part 15 increments a variable (its initial value is "0") indicating the time period T by "1" (#41→#42). Next, the vibration reduction control part 15 determines whether or not the time period T is equal to or longer than the defined time Tref (#43). As described above, in a case where the defined time Tref is about 500 times as long as the execution period (control period), the defined time Tref is "500", for example, and in step #43, the determination is made whether or not the time period T is equal to or longer than 500. In step #43, in a case where the time period T is shorter than the defined time Tref, the non-execution state of the vibration reduction processing is continued. That is, as described with reference to FIG. 3, the vibration reduction control part 15 of the control device 10 does not execute the vibration reduction processing (#43→$3→#6). In step #43, in a case where the time period T is equal to or longer than the defined time Tref, the variable indicating the time period T is reset to the initial value "0", and the vibration reduction processing is started (#43→#44→$4→#7). That is, as described with reference to FIG. 3, the vibration reduction control part 15 of the control device 10 executes the vibration reduction processing on the basis of the post-first-filter variation value F1 (#6).

Note that, in the mode described with reference to FIG. 4, the mode using an increment-type counter has been exemplified. However, the mode is not limited to this mode, and a decrement-type counter or a timer may be used to determine the lapse of the time period T after setting "500" of the defined time Tref as an initial value of the time period T.

As described above, according to the present embodiment, it is possible to reduce the vibration of the vehicle occurring due to the variation of the torque transmitted from the internal combustion engine 1, and it is possible to avoid the aggravation, of the vibration of the vehicle, caused due to the vibration reduction torque that is output from the rotary electric machine 3 and that is output for reducing the vibration.

Other Embodiments

Other embodiments will be described below. Note that the configurations of the embodiments described below are not limited to those applied separately, and can be applied in combination with the configurations of other embodiments as long as no contradiction arises.

(1) In the above description, as exemplarily shown in FIG. 1, the vehicle drive device 100 of a so-called one-motor parallel hybrid has been exemplarily described in which the internal combustion engine 1, the input member 2, the rotary electric machine 3, and the output member 6 are disposed in the described order across the power transmission path from the internal combustion engine 1 to the wheel W. However, the vehicle drive device 100 that is a control target of the control device 10 is not limited to this mode. The vehicle drive device 100 may be configured with a mode (so-called parallel hybrid) in which the rotary electric machine 3 is disposed in parallel to a power transmission path where the internal combustion engine 1, the input member 2, and the output member 6 are disposed in the described order, thereby allowing the rotary electric machine 3 to transmit torque to the power transmission path. Alternatively, the vehicle drive device 100 may be configured with a mode (so-called series-parallel hybrid) in which two rotary electric machines including the rotary electric machine 3 are provided, and in which the internal combustion engine 1, the input member 2, one of the rotary electric machines, a clutch, the other one of the rotary electric machines, and the output member 6 are disposed in the described order across a power transmission path from the internal combustion engine 1 to the wheel W.

(2) In FIG. 1, the mode has been exemplified in which the automatic transmission 4 is disposed between the rotary electric machine 3 and the differential gear device 5. Further, a torque converter may be disposed between the rotary electric machine 3 and the automatic transmission 4.

Outlines of Embodiments

Hereinafter, outlines of the control device (10) described above will be briefly described.

As an aspect, the control device (10) is a control device whose control target is a vehicle drive device (100) including an input member (2) drivingly coupled to an internal combustion engine (1), an output member (6) drivingly coupled to a wheel (W), and a rotary electric machine (3) provided to transmit torque to a power transmission path connecting the input member (2) and the output member (6).

The control device (10) includes:

an input torque detection part (11) configured to detect an input torque variation value (F0) that is a time-varying value of torque transmitted from the internal combustion engine (1) side to the input member (2);

a first filter processing part (12) configured to:

execute first filter processing (#2) of extracting, from the input torque variation value (F0), a torque component that varies with a specific variation period in accordance with a rotation speed of the internal combustion engine (1); and obtain a post-first-filter variation value (F1);

a vibration reduction control part (15) configured to execute vibration reduction processing of calculating an opposite-phase torque variation value (F3) that is a torque variation value whose phase is opposite to a phase of the post-first-filter variation value (F1) and causing torque corresponding to the opposite-phase torque variation value (F3) to be superimposed on output torque of the rotary electric machine (3); and a second filter processing part (13) configured to:

execute second filter processing (#3) of extracting, from the post-first-filter variation value (F1), a torque component that varies with a period longer than the specific variation period; and obtain a post-second-filter variation value (F2), in which the vibration reduction control part (15) is configured to cause the vibration reduction processing to be brought into a non-execution state based on the post-second-filter variation value (F2).

By executing the vibration reduction processing, it is possible to reduce the torque component that varies with the specific variation period in accordance with the rotation speed of the internal combustion engine (1). However, depending on the filter characteristics in the first filter processing (#1), there are possibilities that a torque component having a period different from the specific variation period, in particular, a period longer than the specific variation period cannot be appropriately removed, and that the longer-period torque variation may be amplified through the vibration reduction processing. According to the configuration, the vibration reduction processing is caused to be brought into the non-execution state based on the post-second-filter variation value (F2). Thus, it is possible to cause the vibration reduction processing not to be executed, in a case where the longer-period torque variation is amplified through the vibration reduction processing. Thus, it is possible to avoid amplifying this longer-period torque variation, thereby avoiding aggravating the vibration of the vehicle. That is, according to the configuration, it is possible to reduce the vibration of the vehicle occurring due to the variation of the torque transmitted from the internal combustion engine (1), and it is possible to avoid the aggravation, of the vibration of the vehicle, caused due to the vibration reduction torque that is output from the rotary electric machine (3) and that is output for reducing the vibration.

Here, the vibration reduction control part (15) preferably causes the vibration reduction processing to be brought into a non-execution state, in a case where amplitude of the post-second-filter variation value (F2) is equal to or greater than a defined determination threshold value.

According to this configuration, the control device (10) can appropriately determine that the torque component having the period longer than the specific variation period is large, and can execute control to cause the vibration reduction processing not to be executed. Thus, it is possible to avoid amplifying the longer-period torque variation, thereby avoiding aggravating the vibration of the vehicle.

In addition, the vibration reduction control part (15) preferably causes the vibration reduction processing to be brought into an execution state, in a case where the vibration reduction processing is in a non-execution state and a time period (T) during which the amplitude of the post-second-filter variation value (F2) is smaller than the determination threshold value has lasted for a defined time (Tref) or longer.

According to this configuration, the execution state in which the vibration reduction processing is executed and the non-execution state in which the vibration reduction processing is not executed are repeated for each control period (execution period), and a lack in the stability of the control is avoided.

In addition, the determination threshold value is preferably set to a value that is five times or more as great as a torque amplitude of an explosion primary period of the internal combustion engine (1).

According to this configuration, in a case where the amplitude of the post-second-filter variation value (F2) is five times or more as great as the torque amplitude of the explosion primary period, the vibration reduction processing is not executed, and thus the vibration of the vehicle is not aggravated. In addition, in a case where the amplitude of the post-second-filter variation value (F2) is less than five times, the torque vibration having the explosion primary period is reduced through the vibration reduction processing. Therefore, it is possible to reduce the vibration of the vehicle occurring due to the variation of the torque transmitted from the internal combustion engine (1), and it is possible to appropriately avoid the aggravation, of the vibration of the vehicle, caused due to the vibration reduction torque that is output from the rotary electric machine (3) and that is output for reducing the vibration.

In addition, the second filter processing part (#3) is preferably configured to extract a torque component that varies with a period of torque variation generated in the power transmission path due to at least one of a stepwise change in an accelerator opening degree of a vehicle or a state transition between a slipping state and a gripping state of the wheel (W).

According to this configuration, it is possible to appropriately extract, through the second filter processing part (#3), the torque component that is difficult to remove through the first filter processing (#2), and it is possible to appropriately cause the vibration reduction processing not to be executed in a situation where the vibration reduction processing needs to be in the non-execution state.

In addition, a damper (DP) is preferably provided between the internal combustion engine (1) and the input member (2), and the input torque detection part (11) is preferably configured to perform calculation of a variation value of torque transmitted from the damper (DP) to the input member (2) in accordance with torque variation of the internal combustion engine (1), based on an internal combustion engine output angle that is a rotation angle of an output shaft (9) of the internal combustion engine (1) and an input member angle that is a rotation angle of the input member (2), and detect a result of the calculation as the input torque variation value (F0).

According to this configuration, also in a case where the damper (DP) is provided between the internal combustion engine (1) and the input member (2), the control device (10) can appropriately detect, through the input torque detection part (11), the input torque variation value (F0), and can execute, through the vibration reduction control part (15), the vibration reduction processing.

REFERENCE SIGNS LIST

1: Internal combustion engine, 2: Input member, 3: Rotary electric machine, 6: Output member, 9: Output shaft, 10: Control device, 11: Input torque detection part, 12: First filter processing part, 13: Second filter processing part, 14: Amplitude determination part (vibration reduction control part), 15: Vibration reduction control part, 100: Vehicle drive device, DP: Damper, F0: Input torque variation value, F1: Post-first-filter variation value, F2: Post-second-filter variation value, F3: Opposite-phase torque variation value, T: Time period during which amplitude of post-second-filter variation value is smaller than determination threshold value, Tref: Defined time, W: Wheel, #2: First filter processing, and #3: Second filter processing

The invention claimed is:

1. A control device whose control target is a vehicle drive device, the vehicle drive device including an input member drivingly coupled to an internal combustion engine, an output member drivingly coupled to a wheel, and a rotary electric machine provided to transmit torque to a power transmission path connecting the input member and the output member, the control device comprising:

an input torque detection part configured to detect an input torque variation value that is a time-varying value of torque transmitted from the internal combustion engine side to the input member;

a first filter processing part configured to:

execute first filter processing of extracting, from the input torque variation value, a torque component that varies with a specific variation period in accordance with a rotation speed of the internal combustion engine; and obtain a post-first-filter variation value;

a vibration reduction control part configured to execute vibration reduction processing of calculating an opposite-phase torque variation value that is a torque variation value whose phase is opposite to a phase of the post-first-filter variation value and causing torque corresponding to the opposite-phase torque variation value to be superimposed on output torque of the rotary electric machine; and a second filter processing part configured to:

execute second filter processing of extracting, from the post-first-filter variation value, a torque component that varies with a period longer than the specific variation period; and obtain a post-second-filter variation value, wherein the vibration reduction control part is configured to cause the vibration reduction processing to be brought into a non-execution state based on the post-second-filter variation value.

2. The control device according to claim 1, wherein the vibration reduction control part causes the vibration reduction processing to be brought into a non-execution state, in a case where amplitude of the post-second-filter variation value is equal to or greater than a defined determination threshold value.

3. The control device according to claim 2, wherein the vibration reduction control part causes the vibration reduction processing to be brought into an execution state, in a case where the vibration reduction processing is in a non-execution state and a time period during which the amplitude of the post-second-filter variation value is smaller than the determination threshold value has lasted for a defined time or longer.

4. The control device according to claim 3, wherein the determination threshold value is set to a value that is five times or more as great as a torque amplitude of an explosion primary period of the internal combustion engine.

5. The control device according to claim 4, wherein the second filter processing part is configured to extract a torque component that varies with a period of torque variation generated in the power transmission path due to at least one of a stepwise change in an accelerator opening degree of a vehicle or a state transition between a slipping state and a gripping state of the wheel.

6. The control device according to claim 5, wherein a damper is provided between the internal combustion engine and the input member, and the input torque detection part is configured to:

perform calculation of a variation value of torque transmitted from the damper to the input member in accordance with torque variation of the internal combustion engine, based on an internal combustion engine output angle that is a rotation angle of an output shaft of the internal combustion engine and an input member angle that is a rotation angle of the input member; and detect a result of the calculation as the input torque variation value.

7. The control device according to claim 4, wherein a damper is provided between the internal combustion engine and the input member, and the input torque detection part is configured to:

perform calculation of a variation value of torque transmitted from the damper to the input member in accordance with torque variation of the internal combustion engine, based on an internal combustion engine output angle that is a rotation angle of an output shaft of the internal combustion engine and an input member angle that is a rotation angle of the input member; and detect a result of the calculation as the input torque variation value.

8. The control device according to claim 3, wherein the second filter processing part is configured to extract a torque component that varies with a period of torque variation generated in the power transmission path due to at least one of a stepwise change in an accelerator opening degree of a vehicle or a state transition between a slipping state and a gripping state of the wheel.

9. The control device according to claim 8, wherein a damper is provided between the internal combustion engine and the input member, and the input torque detection part is configured to:

perform calculation of a variation value of torque transmitted from the damper to the input member in accordance with torque variation of the internal combustion engine, based on an internal combustion engine output angle that is a rotation angle of an output shaft of the internal combustion engine and an input member angle that is a rotation angle of the input member; and detect a result of the calculation as the input torque variation value.

10. The control device according to claim 3, wherein a damper is provided between the internal combustion engine and the input member, and the input torque detection part is configured to:

perform calculation of a variation value of torque transmitted from the damper to the input member in accordance with torque variation of the internal combustion engine, based on an internal combustion engine output angle that is a rotation angle of an output shaft of the internal combustion engine and an input member angle that is a rotation angle of the input member; and detect a result of the calculation as the input torque variation value.

11. The control device according to claim 2, wherein the determination threshold value is set to a value that is five times or more as great as a torque amplitude of an explosion primary period of the internal combustion engine.

12. The control device according to claim 11, wherein the second filter processing part is configured to extract a torque component that varies with a period of torque variation generated in the power transmission path due to at least one of a stepwise change in an accelerator opening degree of a vehicle or a state transition between a slipping state and a gripping state of the wheel.

13. The control device according to claim 12, wherein a damper is provided between the internal combustion engine and the input member, and the input torque detection part is configured to:

perform calculation of a variation value of torque transmitted from the damper to the input member in accordance with torque variation of the internal combustion engine, based on an internal combustion engine output angle that is a rotation angle of an output shaft of the internal combustion engine and an input member angle that is a rotation angle of the input member; and detect a result of the calculation as the input torque variation value.

14. The control device according to claim 11, wherein a damper is provided between the internal combustion engine and the input member, and the input torque detection part is configured to:

perform calculation of a variation value of torque transmitted from the damper to the input member in accordance with torque variation of the internal combustion engine, based on an internal combustion engine output angle that is a rotation angle of an output shaft of the internal combustion engine and an input member angle that is a rotation angle of the input member; and detect a result of the calculation as the input torque variation value.

15. The control device according to claim 2, wherein the second filter processing part is configured to extract a torque component that varies with a period of torque variation generated in the power transmission path due to at least one of a stepwise change in an accelerator opening degree of a vehicle or a state transition between a slipping state and a gripping state of the wheel.

16. The control device according to claim 15, wherein a damper is provided between the internal combustion engine and the input member, and the input torque detection part is configured to:

perform calculation of a variation value of torque transmitted from the damper to the input member in accordance with torque variation of the internal combustion engine, based on an internal combustion engine output angle that is a rotation angle of an output shaft of the internal combustion engine and an input member angle that is a rotation angle of the input member; and detect a result of the calculation as the input torque variation value.

17. The control device according to claim 2, wherein a damper is provided between the internal combustion engine and the input member, and the input torque detection part is configured to:

perform calculation of a variation value of torque transmitted from the damper to the input member in accordance with torque variation of the internal combustion engine, based on an internal combustion engine output angle that is a rotation angle of an output shaft of the internal combustion engine and an input member angle that is a rotation angle of the input member; and detect a result of the calculation as the input torque variation value.

18. The control device according to claim 1, wherein the second filter processing part is configured to extract a torque component that varies with a period of torque variation generated in the power transmission path due to at least one of a stepwise change in an accelerator opening degree of a vehicle or a state transition between a slipping state and a gripping state of the wheel.

19. The control device according to claim 18, wherein a damper is provided between the internal combustion engine and the input member, and the input torque detection part is configured to:

perform calculation of a variation value of torque transmitted from the damper to the input member in accordance with torque variation of the internal combustion engine, based on an internal combustion engine output angle that is a rotation angle of an output shaft of the internal combustion engine and an input member angle that is a rotation angle of the input member; and detect a result of the calculation as the input torque variation value.

20. The control device according to claim 1, wherein a damper is provided between the internal combustion engine and the input member, and the input torque detection part is configured to:

perform calculation of a variation value of torque transmitted from the damper to the input member in accordance with torque variation of the internal combustion engine, based on an internal combustion engine output angle that is a rotation angle of an output shaft of the internal combustion engine and an input member angle that is a rotation angle of the input member; and detect a result of the calculation as the input torque variation value.

* * * * *